(12) United States Patent
Stoddart et al.

(10) Patent No.: US 9,399,803 B2
(45) Date of Patent: Jul. 26, 2016

(54) COMPOUNDS AND METHODS TO ISOLATE GOLD

(71) Applicant: Northwestern University, Evanston, IL (US)

(72) Inventors: J. Fraser Stoddart, Evanston, IL (US); Zhichang Liu, Evanston, IL (US); Marco Frasconi, Evanston, IL (US); Dennis Cao, Evanston, IL (US)

(73) Assignee: Northwestern University, Evanston, IL (US)

( * ) Notice: Subject to any disclaimer, the term of this patent is extended or adjusted under 35 U.S.C. 154(b) by 268 days.

(21) Appl. No.: 14/256,578

(22) Filed: Apr. 18, 2014

(65) Prior Publication Data

US 2014/0311297 A1     Oct. 23, 2014

Related U.S. Application Data (60) Provisional application No. 61/814,066, filed on Apr. 19, 2013.

(51) Int. Cl.
| | | |
|---|---|---|
| C22B 11/00 | (2006.01) | |
| C22B 3/00 | (2006.01) | |
| C22B 3/44 | (2006.01) | |

(52) U.S. Cl.
CPC . *C22B 11/04* (2013.01); *C22B 3/44* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 4,086,084 | A * | 4/1978 | Oliver | C22B 1/08 423/108 |
| 4,551,213 | A * | 11/1985 | Wilson | C22B 11/04 205/566 |
| 4,740,243 | A * | 4/1988 | Krebs-Yuill | C22B 3/18 423/109 |
| 5,881,358 | A * | 3/1999 | Miyano | C22B 3/0008 423/139 |
| 7,232,474 | B2 * | 6/2007 | Bouvrette | B01J 35/0013 75/362 |
| 2011/0314967 | A1 * | 12/2011 | Framroze | C22B 1/00 75/711 |

FOREIGN PATENT DOCUMENTS

WO    2012090034    7/2012

OTHER PUBLICATIONS

Alston, D. R., Slawin, A. M. Z., Stoddart, J. F. & Williams, D. J. Cyclodextrins as second sphere ligands for transition metal complexes—The X-ray crystal structure of [Rh(cod)(NH3)2•a-cyclodextrin][PF6]•6H2O, Angew, Chem, Int. Ed. Engl. 24, 786-787 (1985).

(Continued)

*Primary Examiner* — Steven Bos
(74) *Attorney, Agent, or Firm* — Honigman Miller Schwartz and Cohn LLP; Noel E. Day; Jonathan P. O'Brien (57) ABSTRACT

Methods for recovering gold from gold-bearing materials are provided. The methods rely upon on the self-assembly of $KAuBr_4$ and α-cyclodextrin (α-CD) in aqueous solution to form a co-precipitate, a 1:2 complex, $KAuBr_4 \cdot (\alpha\text{-CD})_2$ ("α•Br"), either alone or in an extended $\{[K(OH_2)_6][AuBr_4] \subset (\alpha\text{-CD})_2\}_n$ chain superstructure (FIG. 1). The co-precipitation of α•Br is selective for gold, even in the presence of other metals, including other square-planar noble metals. The method enables one to isolate gold from gold-bearing materials from diverse sources, as further described.

20 Claims, 6 Drawing Sheets

(56) References Cited

OTHER PUBLICATIONS

Alston, D. R., Slawin, A. M. Z., Stoddart, J. F. & Williams, D. J. The X-ray crystal structure of a 1:1 adduct between a-cyclodextrin and cyclobutane-1,1-dicarboxylatodiammineplationum(II). J. Chemc. Soc., Chem. Commun. 1602-1604 (1985).

Colquhoun, H. M., Stoddart, J. F. & Williams, D. J Second-sphere coordination—a novel role for molecular receptors, Angew, Chem. Int. Ed. Engli, 25, 487-507 (1986).

Harada, A. & Takahashi, S. Preparation and properties of cyclodextrin-ferrocene inclusion complexes. J. Chemc. Soc., Chem. Commun. 645-646 (1984).

Harada, A., Yamamoto, S. & Takahashi, S. Preparation and properties of inclusion compounds of transition-metal complexes oc cylcoocta-1,5-diene and norbornadiene with cyclodextrins. Organomettalics 8, 2560-2563 (1989).

Mähler, J. & Persson, I. A study of the hydration of the alkali metal ions in aqueous solution. Inorg. Chem. 51, 425-438 (2012).

Geißelmann, A., Klüfers, P., Kropfgans, C., Mayer, P. & Piotrowski, H. Carbohydrate-metal interactions shaped by supramolecular assembling. Angew, Chem. Int. Ed. 44, 924-927 (2005).

Steiner, T. Hydrogen-bond distances to halid ions in organic and organometallic crystal structrues: up-to-date database study. Acta Crystallogr. B 54 456-463 (1998).

Aullon, G., Bellamyn, D., Guy Orpen, A., Brammer, L. & Eric, A. B. Metal-bound chlorine often accepts hydrogen bonds. Chem. Commun. 653-654 (1998).

Liu, Z. et al., Selective isolation of fold facilitated by second-sphere coordination with a-cyclodextrin, Nat. Commun. 4: 1855 doi: 10.1038 Incomms 289 (2013).

* cited by examiner

COMPOUNDS AND METHODS TO ISOLATE GOLD

CROSS-REFERENCE TO RELATED APPLICATIONS

This application claims benefit of priority to U.S. provisional application No. 61/814,066, filed on Apr. 19, 2013, which is incorporated by reference in its entirety.

FIELD OF THE INVENTION

This invention pertains to compounds and methods to use in the isolation and recovery of gold from gold-bearing materials.

BACKGROUND OF THE INVENTION

Considerable interest exists in methods for recovering gold from gold-bearing materials. Besides the obvious economic incentives associated with gold being a precious metal, environmental motivations justify extracting gold from certain gold-bearing waste materials (for example, consumer electronics). A common method for gold recovery uses a cyanide leaching process in which highly poisonous inorganic cyanides convert gold(0) into a water-soluble $Au(CN)_2$-coordination complex, which is subsequently isolated using cementation, absorption, or solvent extraction as typical methods. The cyanide leaching process for gold recovery is undesirable, as accidental leakages of cyanide result in environmental contamination and inadvertent cyanide exposure to those who conduct the process causes needless human health concerns. Accordingly, developing processes for gold recovery using environmentally benign chemistry is not only important from a green chemistry perspective, but such efforts may also lead to health benefits for the processing workers.

BRIEF SUMMARY OF THE INVENTION

In a first aspect, a first method for isolating gold from a gold-bearing material is provided. The method includes several steps. The first step includes adding HX and an acid to the gold-bearing material to form a first dissolved gold solution. The HX is a hydrogen halide. The second step includes adding a base to the first dissolved gold solution to form a second dissolved gold solution. The third step includes adding a cyclodextrin to the second dissolved gold solution to form a precipitate in the second dissolved gold solution. The fourth step includes isolating the precipitate from the second dissolved gold solution. The precipitate comprises gold in the form of a gold-cyclodextrin complex.

In a second aspect, a second method for isolating gold from a gold-bearing material is provided. The method includes several steps. The first step is generating a solution comprising sodium hypobromite or potassium hypobromite. The second step is adding the solution to the gold-bearing material to form a first dissolved gold solution. The third step is adding a cyclodextrin to the first dissolved gold solution to form a precipitate in the first dissolved gold solution. The fourth step is isolating the precipitate from the first dissolved gold solution. The precipitate comprises a gold-cyclodextrin complex.

In a third aspect, a third method for isolating gold from a gold-bearing material is provided. The method includes several steps. The first step is adding an aqueous solution comprising 1,3-dibromo-5,5-dimethylhydantoin and HBr to the gold-bearing material to form a first dissolved gold solution. The second step is adding a base to the first dissolved gold solution to form a second dissolved gold solution. The third step is adding a cyclodextrin to the second dissolved gold solution to form a precipitate in the second dissolved gold solution. The fourth step is isolating the precipitate from the second dissolved gold solution. The precipitate comprises a gold-cyclodextrin complex.

DETAILED DESCRIPTION OF THE INVENTION

Figure 1:
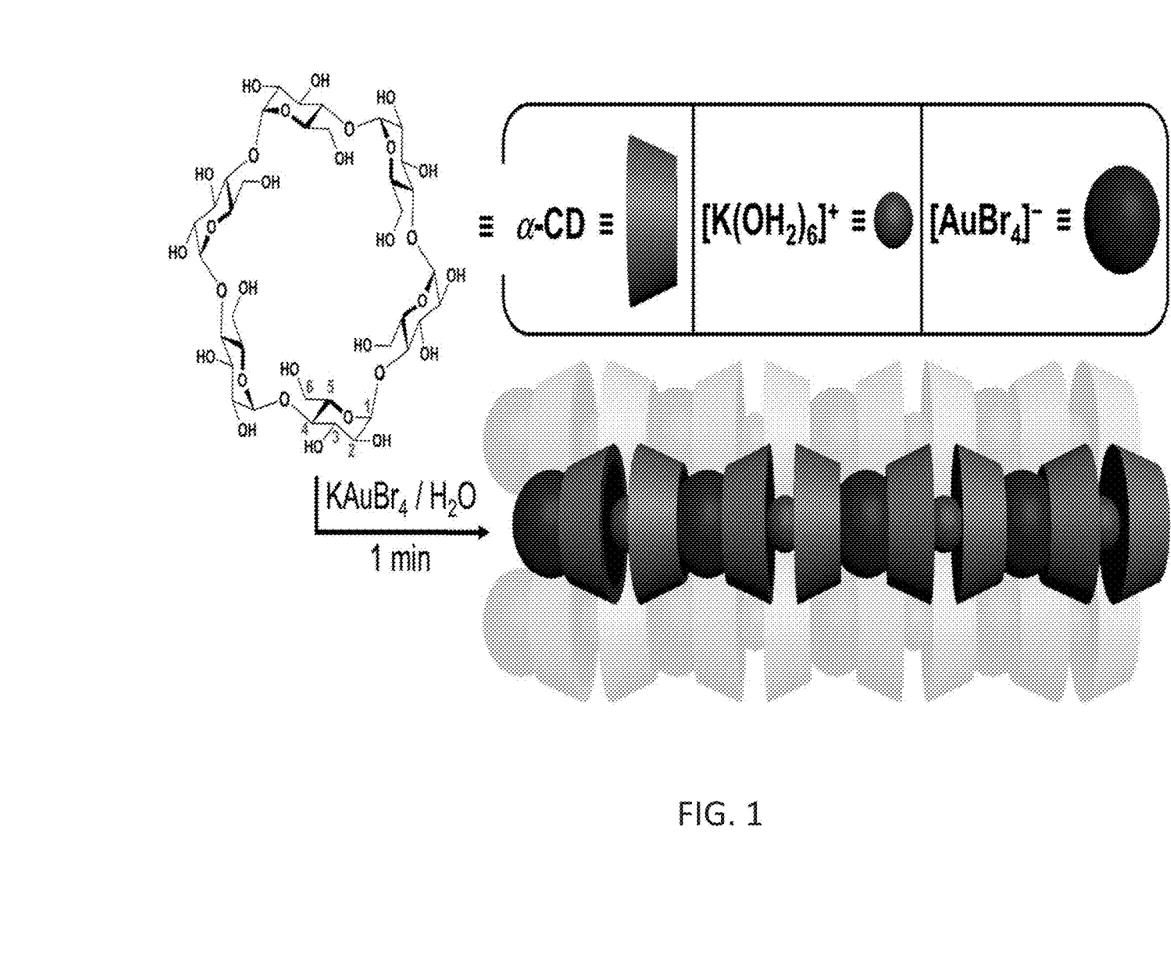
FIG. 1 depicts a schematic representation of the spontaneous self-assembly between $KAuBr_4$ and α-CD in aqueous solution to afford α•Br.

A robust method for recovering gold from gold-bearing materials is provided. The method relies upon on the self-assembly of $KAuBr_4$ and α-cyclodextrin (α-CD) in aqueous solution to form a co-precipitate, a 1:2 complex, $KAuBr_4$•(α-$CD)_2$ ("α•Br"), either alone or in an extended $\{[K(OH_2)_6][AuBr_4] \subset (\alpha\text{-CD})_2\}_n$ (wherein n≥1) chain superstructure (FIG. 1). The co-precipitation of α•Br is selective for gold, even in the presence of other metals, including other square-planar noble metals. The method enables one to isolate gold from gold-bearing materials from diverse sources, as further described below.

Definitions

To aid in understanding the invention, several terms are defined below.

Unless defined otherwise, all technical and scientific terms used herein have the same meaning as commonly understood by one of skill in the art. Although any methods and materials similar to or equivalent to those described herein can be used in the practice or testing of the claims, the exemplary methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one."

The term "about" means within a statistically meaningful range of a value or values such as a stated concentration, length, molecular weight, pH, time frame, temperature, pressure or volume. Such a value or range can be within an order of magnitude, typically within 20%, more typically within 10%, and even more typically within 5% of a given value or range. The allowable variation encompassed by "about" will depend upon the particular system under study.

The terms "comprising," "having," "including," and "containing" are to be construed as open-ended terms (i.e., meaning "including, but not limited to") unless otherwise noted.

Recitation of ranges of values herein are merely intended to serve as a shorthand method of referring individually to each separate value falling within the range, and includes the endpoint boundaries defining the range, unless otherwise indicated herein, and each separate value is incorporated into the specification as if it were individually recited herein.

The term "ore" refers to any native or processed form of natural mineral material from the Earth. Examples of an ore include mineral veins, mineral deposits and the like obtained from waterways, causeways, mines, and other Earth-bound sources known in the art.

The term "metal mixture" refers to two or more elements from Groups IA, HA, IB to VIIIB, the lanthanide series and actinide series of the periodic table. An example of a metal mixture is Au and Pt.

The term "human body component" refers to any natural tissue, organ, appendage or other matter that forms part of the human body or that support or augment human life form. Examples of a human body component include teeth, bones, heart, muscle, joints, legs, arms, hands, fingers, knees, feet, among others. Examples of human body components that support or augment human life form include life support systems and devices, such as a diagnostic machine, a medical device (for example, a dialysis machine), a medical implant (for example, a pacemaker), tooth filling, enamel or inlay, dentures, and an artificial joint, limb or appendage, among others.

The term "post-consumer product" refers to any man-made product for consumption, bartering, exchange or trade. Examples of "post-consumer product" include a jewelry item, an electronics item, precious metal products and coins, among others.

The term "jewelry item" includes any aesthetic item that includes as one component a precious metal. Examples of a jewelry item include a ring, a bracelet and a necklace, among others.

The term " electronics item" refers to a product that includes at least one circuit for conducting electron flow. Examples of an electronics item include a computer, a monitor, a power supply, an amplifier, a preamplifier, a digital to analog converter, an analog to digital converter, and a phone, among others.

The term "precious metal product" includes a partially purified form or a purified form of a noble metal, such as gold, platinum, palladium and silver. Examples of a precious metal include a powder, ingot, or bar of gold, silver, platinum, among others. As used herein, "partially-purified form" refers to a form having from about 10% to about 75% of the pure form of a noble metal. As used herein, "purified form" refers to a form having greater than about 75% of the pure form of a noble metal.

The term "coin" refers to any pressed object composed of a pure metal, mixed metal or metal alloy that can be used as a currency, a collectable, among other uses. As used herein, "pure metal" refers to a single metal of at least 95% or greater purity. As used herein "mixed metal" refers to two or more metals. As used herein "metal alloy" refers to a mixture or solid solution of a metal with at least one other element.

Selective Isolation of Gold from Gold-Bearing Materials.

Figure 2A:
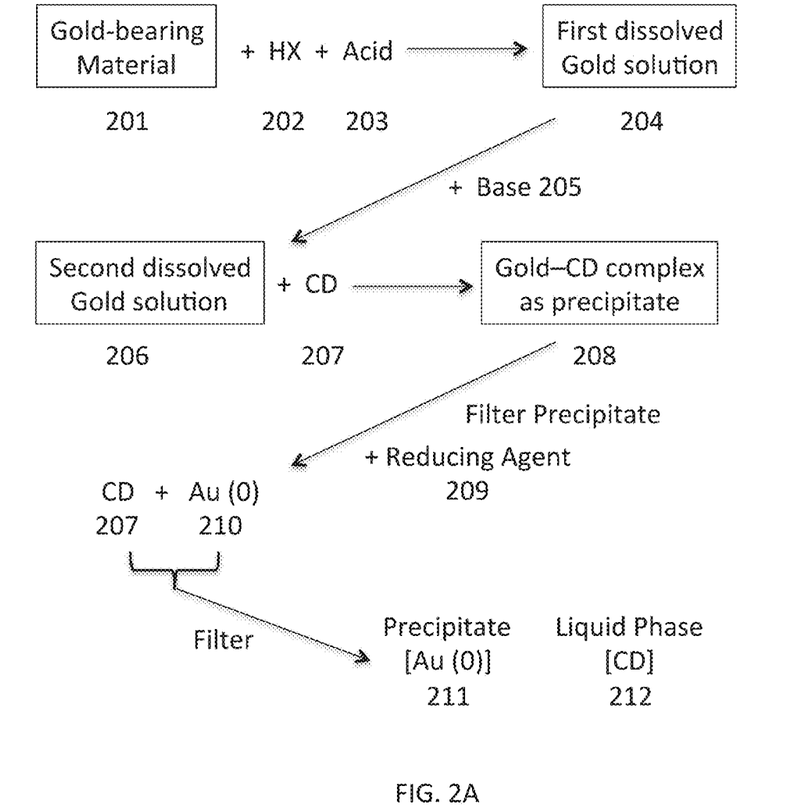
FIG. 2A depicts a schematic of the disclosed innovative method for isolating gold from a gold-bearing material.

A method for isolating and recovering gold from gold-bearing materials was developed based upon the selective co-precipitation of α•Br between α-CD and $KAuBr_4$. Referring to FIG. 2A, a gold-bearing material 201 is combined with a hydrogen halide ("HX") 202 and an acid 203 to form first dissolved gold solution 204. Hydrogen halide 202 can be any compound having the formula HX, wherein X is one of the halogens: fluorine, chlorine, bromine, iodine and astatine. In one aspect of the method, hydrogen halide 202 can include mixtures of two or more of the foregoing compounds having the formula HX, as disclosed herein. Acid 203 can include any strong acid, such as any of the foregoing hydrogen halides, $HNO_3$, $H_2SO_4$, among others. The pH of the first dissolved gold solution 204 will be less than about pH 4 and more typically, less than about pH 2. The gold of the gold-bearing material 201 reacts with the hydrogen halide 202 and the acid 203 to form the product $HAuX_4$.

Referring to FIG. 2A, a base 205 is added to the first dissolved gold solution 204 to form a second dissolved gold solution 206. Examples of base 205 include a strong base, such as hydroxides of Group IA and HA metals (for example, LiOH, NaOH, KOH, CsOH, RbOH, $Ca(OH)_2$, $Ba(OH)_2$. among others). The purpose of base 205 in the second dissolved solution 206 is to adjust the final pH of the second dissolved gold solution 206; preferably, the final pH of the second dissolved solution 206 is in the range from about pH 2 to about pH 7. As a result of adding base 205 to second dissolved solution 206, the product $HAuX_4$ is converted to the salt form, $[Y^{m+}][AuX_4^-]_m$, where m is 1 or 2, depending on whether the base is a Group IA metal or Group IIA metal, respectively.

Referring to FIG. 2A, a cyclodextrin ("CD") 207 is added to the second dissolved gold solution 206 to form a precipitate 208. A preferred cyclodextrin 207 includes α-cyclodextrin, β-cyclodextrin and γ-cyclodextrin. Precipitate 208 includes a complex of gold with the cyclodextrin ("gold-cyclodextrin complex"). More particularly in some aspects, precipitate 208 includes a gold-cyclodextrin complex such as $KAuBr_4$•$(\alpha$-$CD)_2$ ("α•Br"), either alone or in an extended $\{[K(OH_2)_6][AuBr_4] \subset (\alpha$-$CD)_2\}_n$, wherein n is equal to or greater than 1 (FIG. 1).

Referring to FIG. 2A, precipitate 208 is isolated from the second dissolved gold solution 206. Any means of isolation can be used to obtain precipitate 208, include filtration, centrifugation and other separation methods known in the art.

In some aspects of applying the method of FIG. 2A, not all of gold-bearing material 201 can be dissolved in one of the first dissolved gold solution 204 or the second dissolved gold solution 206. As a result, some solid remnants of gold-bearing material 201 (whether or not including gold) can persist. In such aspects, it is desirable to include a filtration step to remove the solid remnants prior to subsequent processing one of the first dissolved gold solution 204 or the second dissolved gold solution 206. The resultant filtrate is processed as described above to obtain the isolated gold.

Referring to FIG. 2A, precipitate 208 can be treated with a reducing agent 209 to produce elemental gold 210 (Au(0)) uncomplexed to the cyclodextrin 207. Examples of reducing agent 209 include $NaBH_4$, $Na_2S_2O_5$, and $H_2C_2O_4$, among others. The elemental gold 210 can be readily isolated as a precipitate 211 and the cyclodextrin 207 can be harvested in the liquid phase 212 and recycled for reuse.

Figure 2B:
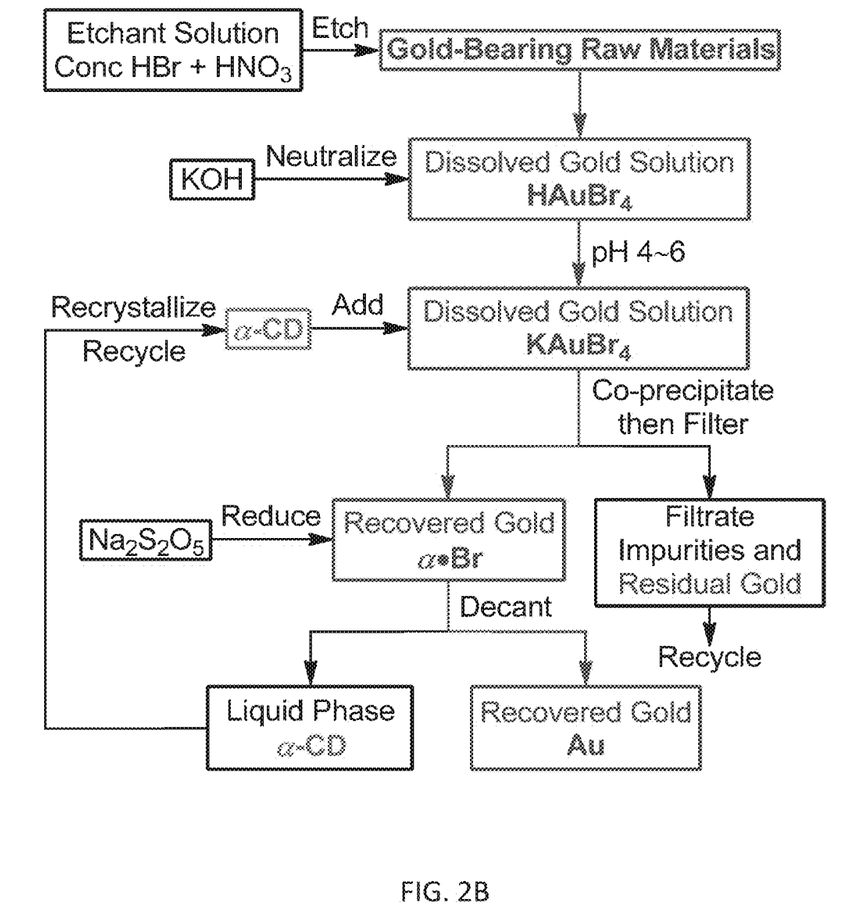
FIG. 2B illustrates a specific embodiment of the disclosed method for isolating gold from a gold-bearing material that includes a metal mixture.

An exemplary aspect of the process outlined generally in FIG. 2A is depicted in FIG. 2B. The first dissolved gold solution 204 includes gold-bearing material 201 being one or more gold alloy scraps, HX 202 is HBr, acid 203 is $HNO_3$. The resultant first dissolved gold solution 204 also includes $HAuBr_4$ that forms as a result of reaction between the gold in gold-bearing material 201, HBr (HX 202) and $HNO_3$ (acid 203). Base 205, KOH, is added first dissolved gold solution 204 to form a second dissolved gold solution 206 having a pH in the range from about pH 2.0 to about pH 7.0. Thereafter, cyclodextrin 207 having the structure of α-cyclodextrin is added to the second dissolved gold solution 206 to form precipitate 208. The structure of precipitate 208 is α•Br. The precipitate 208 is filtered from the second dissolved gold solution 206, the latter of which typically includes residual, uncomplexed gold in some cases. A secondary round of exposure to a cyclodextrin 207 can further process the uncomplexed gold remaining in the second dissolved gold solution 206. Precipitate 208 is subjected to reduction with reducing agent 209 to form elemental gold 210, wherein the reducing agent 209 is $Na_2S_2O_5$. The elemental gold 210 can be separated from the mother liquor of the second dissolved gold solution 206 by decantation, thereby allowing the cyclodextrin 207 to be recycled for use following recrystallization. This aspect is described in detail in the examples.

Figure 3A:
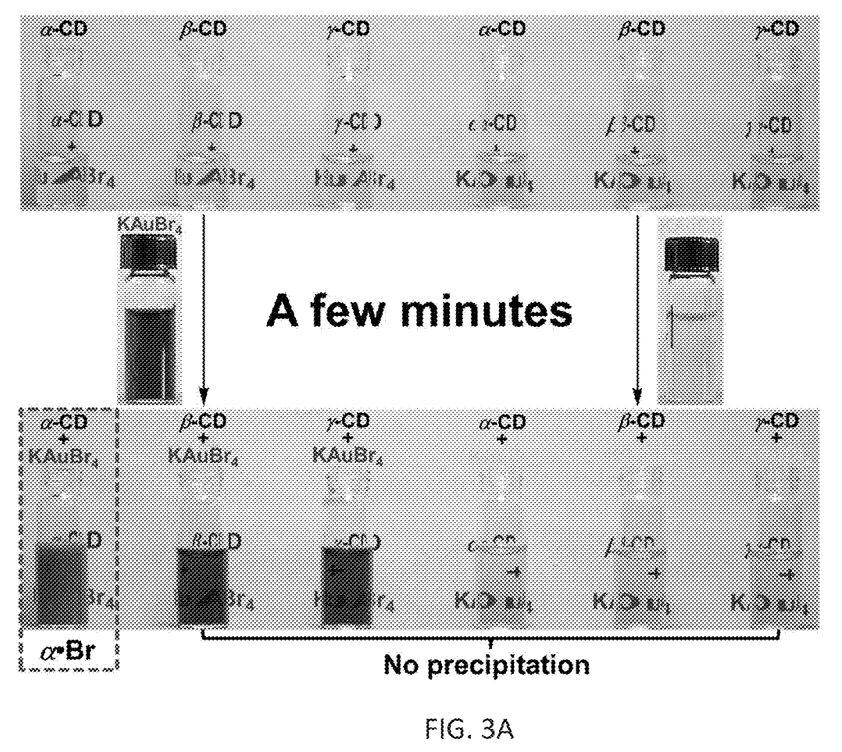
FIG. 3A illustrates formation and co-precipitation of α•Br from a mixture containing $KAuBr_4$ and α-CD. When an aqueous solution (20 mM, 1 mL) of $KAuX_4$ (X=Cl or Br) is added to an aqueous solution (26.7 mM, 1.5 mL) of α-, β-, or γ-CDs, then a shiny pale brown suspension forms exclusively from the combination of $KAuBr_4$ and α-CD within 1-2 min.

The ability for cyclodextrin 207 to complex with $KAuBr_4$ of the second dissolved gold solution 206 to form precipitate 208 is specific for the $[AuBr_4]^-$ anion, as cyclodextrin 207 does not form precipitate 208 in a second dissolved gold solution 206 that includes $[AuCl_4]^-$ anion in the form of salt $KAuCl_4$ (FIG. 3A). Furthermore, cyclodextrin 207 can be α-cyclodextrin, (β-cyclodextrin or γ-cyclodextrin in promoting complex formation with $KAuBr_4$ of the second dissolved gold solution 206 to form precipitate 208 (FIG. 3A).

Figure 3B:
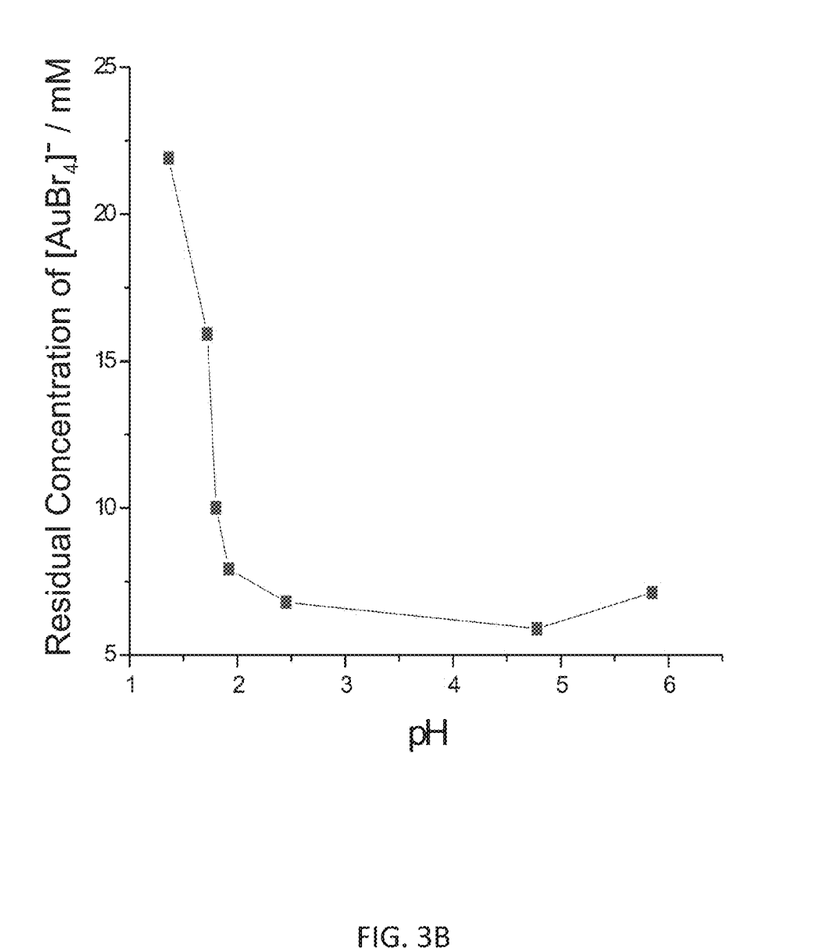
FIG. 3B depicts effect of pH on the residual concentration of $[AuBr4]^-$.

Co-precipitation experiments conducted by adding α-CD into $[AuBr_4]^-$ solutions (50 mM) of various pH (1.4-5.9) indicate a trend in the residual concentration of $[AuBr4]^-$ in the filtrate after filtration to remove the co-precipitates (FIG. 3B). When the pH is increased from 1.4 to 2.5, the residual concentration of $[AuBr_4]^-$ decreases to ~6.8 mM, which is consistent with the bulk solubility of α•Br in water, and remains constant at this value until pH 5.9 is attained (FIG. 3B). This result reveals that the co-precipitation of α-CD with $[AuBr_4]^-$ is dependent on pH, and that the pH range 2.5~5.9 is the suitable one to initiate this co-precipitation process. This aspect is described in detail in the examples.

Specificity of α-Cyclodextrin for Forming α•Br

Figure 4:
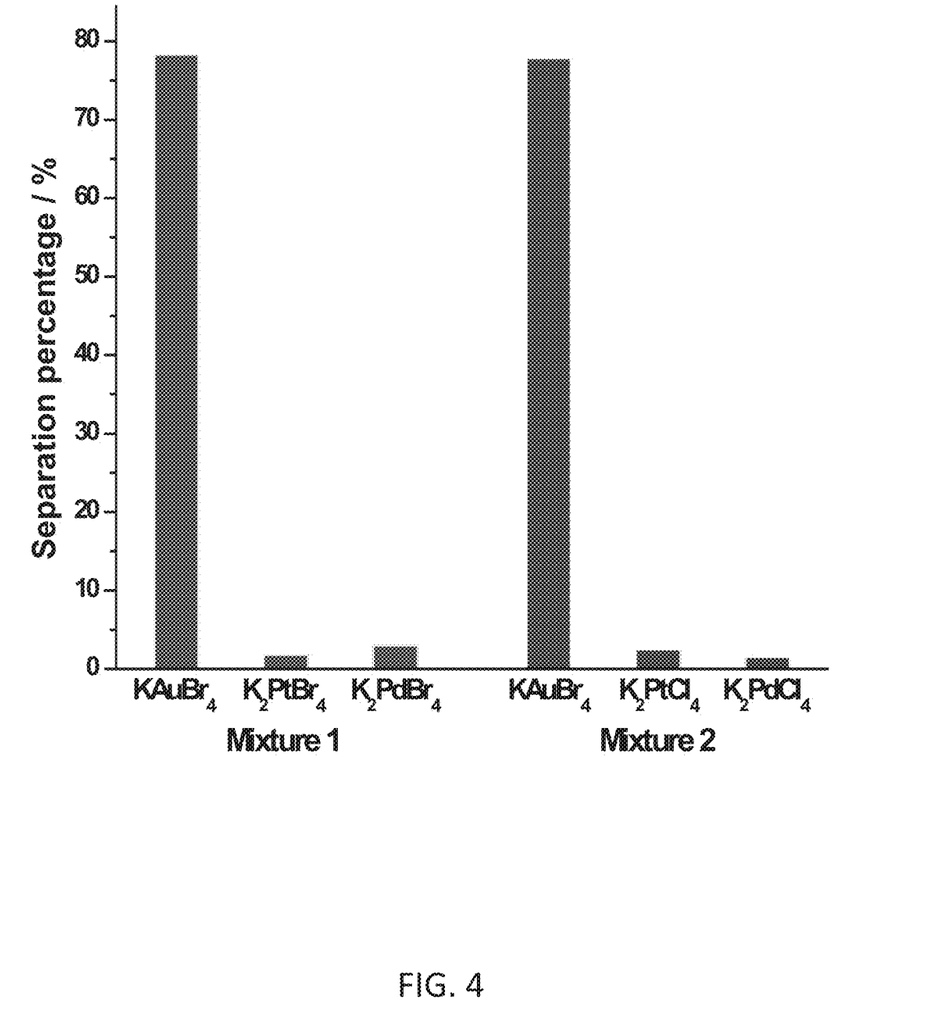
FIG. 4 depicts selective precipitation and separation of gold from mixed metal mixtures 1 (red) and 2 (blue). The separation percentage is defined as (Cb−Ca)/Cb, where Cb and Ca are the concentrations of each metal before and after addition of α-CD, respectively

The high selectivity of α-CD rings towards trapping $[AuBr4]^-$ anions is also effective in the presence of other square-planar noble metal complexes, for example, $[PtX_4]^{2-}$ and $[PdX_4]^{2-}$ (X=Cl, Br). To determine an estimate of the separation efficiency, α-CD (0.2 mmol×2) was added separately to (i) a solution (3 mL) containing $KAuBr_4$ (33 mM), $K_2PtBr_4$ (26 mM, saturated) and $K_2PdBr_4$ (33 mM) (Mixture 1), and also to (ii) another solution (3 mL) of $KAuBr_4$ (33 mM), $K_2PtCl_4$ (24 mM, saturated) and $K_2PdCl_4$ (33 mM) (Mixture 2), respectively. As shown in FIG. 4, pale brown precipitates formed in both solutions immediately after the addition. Both precipitates were filtered, and the filtrates were diluted and subjected to inductively coupled plasma optical emission spectroscopy (ICP-OES) elemental analysis to determine the residual amounts of Au, Pt, and Pd remaining in the mother liquor. The separation percentages for Au, Pt, and Pd in both mixtures are defined by comparing contents of Au, Pt, and Pd in the two mixtures before and after addition of α-CD. The ICP-OES analysis results show that 78.3% of Au in Mixture 1 and 77.8% of Au in Mixture 2 were separated out of solution, whereas <3% of Pt and Pd was removed from both mixtures, values which are within the error limit of the experiment (FIG. 4). These results reveal that the capture of $[AuBr4]^-$ ions by α-CD to form α•Br in Mixture 1 and Mixture 2 is a highly selective process even in the presence of other noble metals and augurs well for developing a low cost and environmentally benign procedure for the separation of gold from complex mixtures of similar metal salts. This aspect is described in detail in the examples.

Applications of Method for Recovering Gold from Gold-Bearing Materials.

The method for isolating and recovering gold from gold-bearing materials has several applications. In one aspect, the method can be applied to isolating gold from gold-bearing material, wherein the gold-bearing material is selected from an ore, a metal mixture, a human body component, or a post-consumer product. Examples of an ore include mineral veins, mineral deposits and the like obtained from waterways, causeways, mines, and other Earth-bound sources known in the art. Examples of metal mixture include two or more elements from Groups IA, IIA, IB to VIIIB, the lanthanide series and actinide series of the periodic table, such as a metal mixture that includes Au and Pt. Examples of a human body component include teeth, bones, heart, muscle, joints, legs, arms, hands, fingers, knees, feet, among others. Examples of human body components that support or augment human life form include life support systems and devices, such as a diagnostic machine, a medical device (for example, a dialysis machine), a medical implant (for example, a pacemaker), tooth filling, enamel or inlay, dentures, and an artificial joint, limb or appendage, among others. Examples of post-consumer product include a jewelry item, an electronics item, precious metal products and coins, among others. Examples of a jewelry item include a ring, a bracelet and a necklace, among others. Examples of an electronics item include a computer, a monitor, a power supply, an amplifier, a preamplifier, a digital to analog converter, an analog to digital converter, and a phone, among others. Examples of a precious metal include a powder, ingot, or bar of gold, silver, platinum, among others. Examples of coins include as a currency. The foregoing examples of isolating gold from gold-bearing materials are not limited to the foregoing materials. The specific etching and leaching process for dissolving gold from gold-bearing materials results in formation of a specific gold-halide compound that can be recovered in the form of a complex with cyclodextrin, thereby rendering the method suitable for recovering gold from each of these particular applications as well as other gold-bearing materials.

EXAMPLES

Example 1

Materials

Chemicals were purchased as reagent grade from Aldrich and used without further purification. High purity water was generated by a Milli-Q apparatus (Millipore).

Example 2

Bromine Leaching Methods for Dissolving Gold from Gold-Bearing Materials A bromide solution in conjunction with an appropriate oxidizing agent (such as $HNO_3$, $Br_2$, electrolysis, NaOH and $Br_2$, $H_2O_2$, $BrO^-$, or $O_3$) can be used to dissolve gold. The following methods provide five exemplary ways to dissolve metallic gold into $KAuBr_4$.

(a) Nitric Acid/Hydrobromic Acid

Au+HNO₃+4HBr=HAuBr₄+NO+2H₂O

HAuBr₄+KOH=KAuBr₄+H₂O

Gold (0.25 g) was dissolved in a mixture (4 mL) of concentrated HBr and $HNO_3$ (3/1, V/V) to form $HAuBr_4$. Then, the dissolved gold solution was neutralized to pH 2~7 with KOH to give a solution of KAuBr$_4$ after filtrating to remove insoluble silver bromide. When α-CD (1.44 g) was added to the solution, the co-precipitation of supramolecular complex α•Br occurred immediately. Co-precipitated α•Br—namely, recovered gold—was separated by filtration. The residual gold in the filtrate can be recycled with the next process. The solid-state α•Br was dispersed into water, and then reduced with Na$_2$S$_2$O$_5$ (300 mg) to give the recovered gold metal as a precipitate. The recovered gold metal was collected by decanting off the aqueous, and the remaining α-CD in the liquid phase recycled by recrystallization.

(b) Bronibie/Broinide $$2Au+3Br_2+2KBr=2KAuBr_4$$

A bromide-bromine etchant solution was made by mixing potassium bromide (5.0 g) and bromine (2.9 g) in water (10 mL). Then gold (0.2 g) was dissolved in this bromide-bromine solution (2 mL) after few hours to form a KAuBr$_4$ solution. Similar cyclodextrin extraction procedure in Example 2(a) can be used to give pure gold.

(c) Hypobromite/Bromide $$H^++BrO^-=HBrO$$

$$2Au+3HBrO+5KBr+3H^+=2KAuBr_4+3H_2O+3K^+$$

An aqueous solution was made by mixing potassium bromide (3.0 g) and potassium hypobromite (0.2 g) in water (10 mL). Then the pH value of this solution was tuned to the range of 1-7 with concentrated HBr. Gold (0.2 g) was dissolved in this solution (2 mL) after few hours to form a KAuBr4 solution. Similar cyclodextrin extraction procedure in Example 2(a) can be used to give pure gold.

(d) Ozone/Bromide $$O_3 + Br^- + H^+ = HBrO + O_2$$
$$2Au + 3HBro + 5Br^- + 3H^+ = 2[AuBr_4]^- + 3H_2O$$
...
$$2Au + 3O_3 + 8Br^- + 6H^+ = 2[AuBr_4]^- + 3O_2 + H_2O$$

Ozone (O$_3$) was injected into an aqueous solution (10 mL) containing hydrobromic acid (1.0 g) as well as gold (0.2 g). When the gold was totally dissolved, potassium hydroxide was used to adjust the pH of the solution to the range of 2-7 and gave a KAuBr$_4$ solution. Similar cyclodextrin extraction procedure in Example 2(a) can be used to give pure gold.

(e) Bromine and Potassium Hydroxide

Potassium hydroxide is used commercially to quench bromine gas and the resultant solution is potassium hypobromite which is commercially available. This material can be used as in example 2(c).

(f) In Situ Generation of Sodium Hypobromite or Potassium Hypobromite

Cathode half-reaction: $2Br^- - 2e^- = Br_2$

Anode half-reaction: $2H_2O + 2e^- = 2OH^- + H_2\uparrow$ $Br_2 + 2OH^- = BrO^- + Br^- + H_2O$ $H^+ + BrO^- = HBrO$ An electrolytic cell which can include a graphite material; a second electrode plate including a second surface that can include a graphite material opposing the first surface; an electrolytic reaction zone between the first surface and the second surface; and an inlet to and an outlet from the electrolytic reaction zone. The first electrode plate and the second electrode plate can include impregnated graphite. Electrolysis of a sodium bromide solution will generate in situ sodium hypobromite for use as described above. Alternatively, of a potassium bromide solution will generate in situ potassium hypobromite for use as described above. Typically, An aqueous electrolyte solution (1 L) was prepared containing 0.7 mol/L KBr. The pH value was controlled at a value of pH from about pH 2.0 to about pH 7.0 by adding and acid including, but not limited to, HCl or H$_2$SO$_4$, or a base, including but not limited to NaOH or KOH. The solution was stirred and conducted for a total of 20 hours. The average current was 0.5 A and the voltage was 10 volts. At the end of the experiment, the solution containing hypobromite was generated in the cell. This solution can be used as described above to form the first dissolved gold solution.

(g) 1,3-Dibromo-5,5-dimethylhydantoin (Br$_2$(DMH))/Bromide $$Br_2(DMH)+2H_2O=2HOBr+H_2(DMH)$$

$$2Au+3HOBr+3KBr=2AuBr_3+3\ KOH$$

$$AuBr_3+KBr=KAuBr_4$$

Overall reaction: $4\ Au+3\ Br_2(DMH)+10\ KBr+6\ H^+=4\ KAuBr_4+3\ H_2(DMH)+6\ K^+$ An aqueous solution was prepared by dissolving 1,3-dibromo-5,5-dimethylhydantoin (1 g) in water (10 mL). The solution was adjusted to about pH 1 with concentrated HBr. Gold (0.1 g) was dissolved in this solution. Potassium hydroxide was used to adjust the pH from about pH 2 to about pH 7 of the solution. Similar cyclodextrin extraction procedure in Example 1 can be used to give pure gold.

Example 3

Formation and Characterization of α•Br

An aqueous solution of KAuBr$_4$ (25 mM, 1 mL) was added to an aqueous solution of α-CD (50 mM, 1 mL) at room temperature. A glossy pale brown suspension formed within a few minutes of shaking Centrifugal filtration and drying under vacuum of the suspension allows isolation of the α•Br complex as a pale brown powder in ~70% yield. The phase purity of this complex was confirmed by PXRD. The as-synthesized suspension was spin-coated on a silicon wafer and dried under air. SEM images were obtained using a Hitachi S-4800 FS-SEM. TEM images were obtained on a Hitachi H-2300 TEM operating at 80 kV. Selected area electron diffraction (SAED) patterns were taken with a Hitachi H-8100 instrument at a temperature of 113 K. Powder X-ray diffraction data were collected on a Rigaku ATXG X-ray diffractometer using Cu—K$_\alpha$ radiation (X=1.54178 Å, 50 kV, 240 mA) at room temperature. The observed intensities are in very good agreement with the calculated diffraction pattern based on the single crystal data.

Crystallizations and X-ray analyses for all complexes.

For α•Br: Aqueous solutions of KAuBr$_4$ (3.33 mM, 1 mL) and α-CD (6.67 mM, 1 mL) were mixed together.

For α•Cl, β•Br, β•Cl, γ•Br, and γ•Cl: Aqueous solutions of KAuX$_4$ (20 mM, 1 mL) and CDs (26.7 mM, 1.5 mL) were mixed together and passed through a Pall syringe filter (pore size 0.45 μm) into culture tubes (6 Å~50 mm).

The tubes were allowed to stand at room temperature in a closed 20 mL scintillation vial containing EtOH or MeOH (5 mL). After about one week, the crystals, which appeared in the tubes, were selected and mounted using oil (Infineum V8512) on a glass fiber and transferred to the cold gas stream cooled by liquid N$_2$ on Bruker APEX-II CCDs with graphite monochromated Mo—K$_\alpha$ or Cu—K$_\alpha$ radiation. The structures were solved by direct methods and refined subsequently using OLEX2 software. These data are presented in part in Tables 1 and 2.

TABLE 1

Crystallographic data for all complexes.

| | α•Br | α•Cl | β•Br | β•Cl | γ•Br | γ•Cl |
|---|---|---|---|---|---|---|
| Formula (CD:[AuX$_4$]$^-$) | C$_{72}$H$_{120}$AuBr$_4$KO$_{68}$ (2:1) | C$_{72}$H$_{115}$AuCl$_4$KO$_{68}$ (2:1) | C$_{84}$H$_{143}$AuBr$_4$KO$_{72}$ (2:1) | C$_{84}$H$_{134}$AuCl$_4$KO$_{92}$ (2:1) | C$_{144}$H$_{240}$AuBr$_4$O$_{124}$ (3:1) | C$_{144}$H$_{240}$AuCl$_4$O$_{120}$ (3:1) |
| M$_r$ | 2629.39 | 2446.51 | 2860.69 | 2993.78 | 4312.15 | 4230.13 |
| T[K] | 100 (2) | 100 (2) | 109 (2) | 100 (2) | 100 (2) | 100 (2) |
| Crystal system | orthorhombic | monoclinic | monoclinic | monoclinic | tetragonal | tetragonal |
| Space Group | P2$_1$2$_1$2 | P2$_1$ | P2$_1$ | P2$_1$ | P4$_2$12 | P4$_2$12 |
| a [Å] | 23.7764 (5) | 16.2732 (9) | 15.8246 (4) | 15.7337 (3) | 23.6711 (11) | 23.6973 (3) |
| b [Å] | 14.2049 (6) | 14.1860 (8) β = 90.041 (4)° | 24.5009 (6) β = 108.401 (10)° | 24.3445 (5) β = 108.748 (1)° | 23.6711 (11) | 23.6973 (3) |
| c [Å] | 16.3214 (4) | 23.6996 (12) | 19.0924 (5) | 19.2645 (4) | 22.7697 (14) | 22.8929 (4) |
| V [Å$^3$] | 5512.4 (3) | 5471.1 (5) | 7024.0 (3) | 6987.3 (2) | 12758.3 (10) | 12855.8 (3) |
| Z | 2 | 2 | 2 | 2 | 2 | 2 |
| ρ$_{calcd}$ [g cm$^{-3}$] | 1.584 | 1.485 | 1.353 | 1.392 | 1.122 | 1.093 |
| μ [mm$^{-1}$] | 5.469 | 1.585 | 4.357 | 3.392 | 0.977 | 2.200 |
| F(000) | 2668 | 2514 | 2922 | 3024 | 4490 | 4422 |
| Final R indexes [I > 2σ (I)] | R$_1$ = 0.1072 wR$_2$ = 0.2817 | R$_1$ = 0.0674 wR$_2$ = 0.1694 | R$_1$ = 0.0800 wR$_2$ = 0.2180 | R$_1$ = 0.0601 wR$_2$ = 0.1614 | R$_1$ = 0.0779 wR$_2$ = 0.1995 | R$_1$ = 0.0542 wR$_2$ = 0.1643 |
| Final R indexes [all data] | R$_1$ = 0.1097 wR$_2$ = 0.2835 | R$_1$ = 0.1064 wR$_2$ = 0.1867 | R$_1$ = 0.0829 wR$_2$ = 0.2225 | R$_1$ = 0.0618 wR$_2$ = 0.1630 | R$_1$ = 0.1852 wR$_2$ = 0.2255 | R$_1$ = 0.0615 wR$_2$ = 0.1696 |
| Goodness-of-fit on F$^2$ | 1.129 | 0.987 | 1.032 | 1.058 | 0.836 | 1.061 |
| CCDC No. | 918412 | 918413 | 918414 | 918415 | 918416 | 918417 |

TABLE 2

Au—X (X = Cl, Br) length (Å) and X—Au—X angles (°) of anions [AuX$_4$]$^-$ in all complexes.

| Complex | CD | Anion | Au—X | Length | Avg. Length | X—Au—X | Angle |
|---|---|---|---|---|---|---|---|
| α•Br | α | [AuBr4]$^-$ | Au—Br1 | 2.414(3) | 2.418 | Br1—Au—Br3 | 89.7(2) |
| | | | Au—Br2 | 2.456(3) | | Br2—Au—Br4 | 91.7(2) |
| | | | Au—Br3 | 2.420(5) | | Br1—Au—Br4 | 89.3(2) |
| | | | Au—Br4 | 2.380(5) | | Br2—Au—Br3 | 89.5(2) |
| α•Cl | α | [AuCl4]$^-$ | Au—Cl1 | 2.277(3) | 2.268 | Cl1—Au—Cl2 | 89.9(1) |
| | | | Au—Cl2 | 2.271(2) | | Cl2—Au—Cl4 | 89.2(1) |
| | | | Au—Cl3 | 2.251(3) | | Cl1—Au—Cl3 | 89.9(1) |
| | | | Au—Cl4 | 2.271(3) | | Cl3—Au—Cl4 | 91.0(1) |
| β•Br | β | [AuBr4]$^-$ | Au—Br1 | 2.418(4) | 2.414 | Br1—Au—Br2 | 90.45(9) |
| | | | Au—Br2 | 2.415(2) | | Br2—Au—Br3 | 91.32(5) |
| | | | Au—Br3 | 2.421(1) | | Br3—Au—Br4 | 90.31(6) |
| | | | Au—Br4 | 2.403(2) | | Br4—Au—Br1 | 87.8(1) |
| β•Cl | β | [AuCl4]$^-$ | Au—Cl1 | 2.285(3) | 2.277 | Cl1—Au—Cl2 | 90.6(1) |
| | | | Au—Cl2 | 2.265(3) | | Cl1—Au—Cl4 | 89.8(1) |
| | | | Au—Cl3 | 2.264(5) | | Cl2—Au—Cl3 | 88.6(1) |
| | | | Au—Cl4 | 2.294(3) | | Cl3—Au—Cl4 | 91.1(1) |
| γ•Br | γ | [AuBr4]$^-$ | Au—Br1 | 2.374(3) | 2.374 | Br1—Au—Br1 | 89.5(2) |
| γ•Cl | γ | [AuCl4]$^-$ | Au—Cl1 | 2.270(7) | 2.270 | Cl1—Au—Cl1 | 89.8(3) | pH experiments.

Seven [AuBr$_4$]$^-$ solutions (50 mM, 2 mL) with pH values of 1.4, 1.7, 1.8, 1.9, 2.5, 4.8, and 5.9 were prepared by adjusting identical amounts of HAuBr$_4$ with different amounts of KOH in water. The pH of these solutions were measured with a Hanna Checker pH meter. When α-CD (0.2 mmol×7) was added to the above seven solutions, the co-precipitation occurred immediately (FIG. 3B). The co-precipitates were removed by filtration, and the filtrates were then diluted and analyzed for their residual concentrations of [AuBr$_4$]—by ICPOES.

Example 4

Process for Gold Recovery from Gold-Bearing Materials

A red gold alloy scrap (58% wt Au and 42% wt Cu and Ag, % wt Cu>Ag) and a yellow gold alloy scrap (58% wt Au and 42% wt Cu, Zn and Ag, % wt Ag>Cu>Zn) were employed as gold-bearing raw materials to explore a laboratory scale gold recovery process. In an exemplary aspect of the general procedure (FIG. 2B), the gold-bearing raw material (250 mg) was dissolved in a mixture (4 mL) of concentrated HBr and HNO$_3$ (3/1, V/V). Then, the pH of dissolved gold solution was adjusted to about pH 2~7 with KOH and the resultant solution was filtered to remove insoluble silver bromide. When α-CD (1.48 mmol, 1.44 g) was added to the solution, the co-precipitation of α•Br occurred immediately. Co-precipitated α•Br—namely, recovered gold—was separated by filtration. The residual gold in the filtrate can be recycled with the next process.

The solid-state α•Br was dispersed into water, and then reduced with Na$_2$S$_2$O$_5$ (300 mg) to give the recovered gold metal as a precipitate. The recovered gold metal was collected by decanting off the aqueous phase, and the remaining α-CD in the liquid phase recycled by recrystallization. For the red gold alloy scrap sample, the recovered gold was obtained in 89% yield and 97% purity (ICPOES). For the yellow gold alloy scrap sample, the recovered gold was obtained in 92% yield and 95% purity (ICP-OES).

Additional Acknowledgements

All references, including publications, patent applications, and patents, cited herein are hereby incorporated by reference to the same extent as if each reference were individually and specifically indicated to be incorporated by reference and were set forth in its entirety herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for isolating gold from a gold-bearing material, comprising:
   adding HX and an acid to the gold-bearing material to form a first dissolved gold solution;
   adding a base to the first dissolved gold solution to form a second dissolved gold solution;
   adding a cyclodextrin to the second dissolved gold solution to form a precipitate in the second dissolved gold solution; and
   isolating the precipitate from the second dissolved gold solution,
   wherein HX comprises a hydrogen halide and the precipitate comprises a gold-cyclodextrin complex.

2. The method of claim 1, wherein X is selected from the group consisting of fluorine, chlorine, bromine and iodine.

3. The method of claim 1, wherein the acid is selected from the group consisting of $HNO_3$, $HCl$, $HBr$, $HI$, and $H_2SO_4$.

4. The method of claim 1, wherein the base is selected from the group consisting of LiOH, NaOH, KOH, RbOH, and CsOH.

5. The method of claim 1, wherein the first dissolved gold solution has a pH less than about pH 2.0.

6. The method of claim 1, wherein the second dissolved gold solution has a pH from about pH 2.0 to about pH 7.0.

7. The method of claim 1, wherein the cyclodextrin is selected from the group consisting of α-cyclodextrin, β-cyclodextrin, γ-cyclodextrin and mixtures thereof.

8. The method of claim 1, wherein the precipitate is $KAuBr_4 \cdot (\alpha\text{-}CD)_2 (\alpha \cdot Br$.

9. The method of claim 1, wherein the precipitate has the following structure:

wherein n is equal to or greater than 1.

10. The method of claim 1, wherein the gold-bearing material is selected from an ore, a metal mixture, a human body component, or a post-consumer product.

11. The method of claim 1, wherein the isolating step comprising filtering the precipitate from the second dissolved gold solution.

12. The method of claim 1, further comprising reducing the precipitate with a reductant.

13. The method of claim 12, wherein the reductant is selected from the group consisting of $NaBH_4$, $Na_2S_2O_5$, and $H_2C_2O_4$.

14. The method of claim 12, further comprising isolating gold as reduced, elemental gold.

15. A method for isolating gold from a gold-bearing material, comprising:
   generating a solution comprising sodium hypobromite or potassium hypobromite;
   adding the solution to the gold-bearing material to form a first dissolved gold solution;
   adding a cyclodextrin to the first dissolved gold solution to form a precipitate in the first dissolved gold solution; and
   isolating the precipitate from the first dissolved gold solution,
   wherein the precipitate comprises a gold-cyclodextrin complex.

16. The method of claim 15, wherein the cyclodextrin is selected from the group consisting of α-cyclodextrin, β-cyclodextrin, γ-cyclodextrin and mixtures thereof.

17. The method of claim 15, wherein the gold-bearing material is selected from an ore, a metal mixture, a human body component, or a post-consumer product.

18. A method for isolating gold from a gold-bearing material, comprising:
   adding an aqueous solution comprising 1,3-dibromo-5,5-dimethylhydantoin and HBr to the gold-bearing material to form a first dissolved gold solution;
   adding a base to the first dissolved gold solution to form a second dissolved gold solution;
   adding a cyclodextrin to the second dissolved gold solution to form a precipitate in the second dissolved gold solution; and
   isolating the precipitate from the second dissolved gold solution,
   wherein the precipitate comprises a gold-cyclodextrin complex.

19. The method of claim 18, wherein the cyclodextrin is selected from the group consisting of α-cyclodextrin, β-cyclodextrin, γ-cyclodextrin and mixtures thereof.

20. The method of claim 18, wherein the gold-bearing material is selected from an ore, a metal mixture, a human body component, or a post-consumer product.

* * * * *